Aug. 4, 1931.  P. M. MILLER  1,817,700
MEANS LOCKING PNEUMATIC TIRES ON WHEELS
Filed May 26, 1924
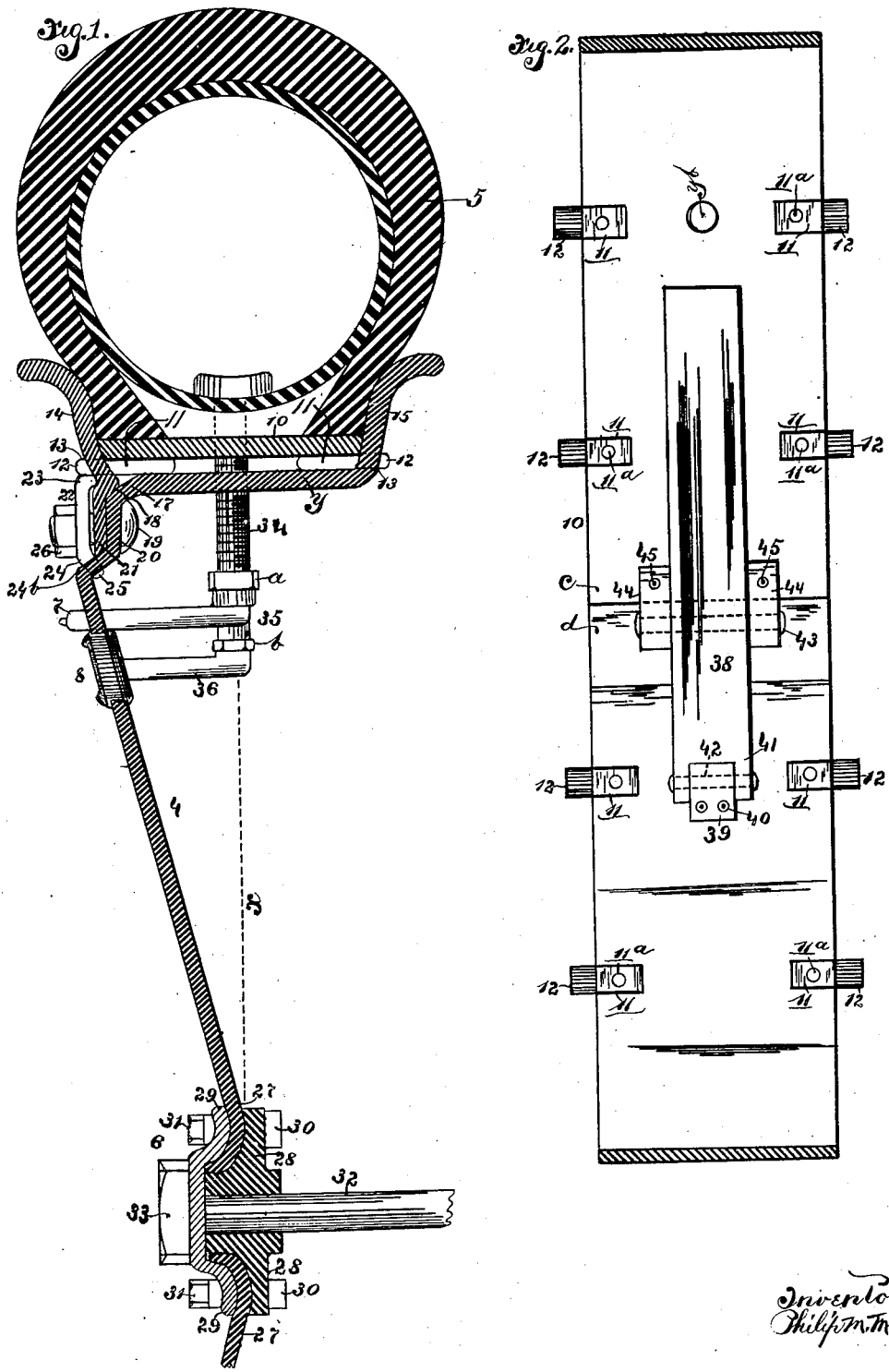

Patented Aug. 4, 1931

1,817,700

UNITED STATES PATENT OFFICE

PHILIP M. MILLER, OF BROOKLYN, NEW YORK

MEANS LOCKING PNEUMATIC TIRES ON WHEELS

Application filed May 26, 1924. Serial No. 716,072.

This invention relates to vehicle wheels of the type on which a pneumatic tire is provided with a removable collapsible base that carries the tire and is engaged by the sides of the fixed tire flange and removable tire flange.

An object of the invention is the provision of a rim that is adapted to be fixed to or engaged with a vehicle wheel body to removably carry a pneumatic tire mounted on a transplit annular base which is adapted to be removed with the tire.

The principal object of the invention is the provision of means to prevent rusting of the beads and sides of a tire to the metal face of the rim periphery of a vehicle wheel while the tire is in service on the wheel, thereby tending to "freeze" the tire thereon and preventing easy separation of the tire from the wheel, owing to the natural tendency of rubber or its compounds to "freeze" as it is called, or vulcanize on metal. By means of the contractible base on which the tire is mounted, the latter is bodily removed with the base from the wheel periphery and the base is then easily separated therefrom owing to the fact that the tire base is contractible.

The present invention, in a sense is a development of the construction described in application Serial No. 571,804, filed June 29, 1922.

With the above and numerous other objects in view as will appear as the description proceeds, the invention resides in certain novel features of construction, and in the combination and arrangement of parts as will be hereinafter fully described and claimed.

A desirable form in which my invention may be embodied is illustrated in Fig. 1 which is a cross sectional view of a portion of a wheel including my rim and tire base with a tire in operative position. Fig. 2 is a plan view of a portion of the tire base.

In carrying the invention into effect, the wheel periphery construction may in any preferable manner form a part of any wheel body. The wheel body 4 as shown is preferably provided with a transverse body Y formed at the inner side with an integral annular, outwardly flared flange 15. The body Y is merged with an inclined or tapered portion 17 at the outer side, which continues radially as shown at 18, to the formation of a straight side wall 20 which terminates in a tapered or inclined seat shown at 24$^b$, wherein spaced apertures are provided for the purpose hereinafter described.

A removable annular, transplit base 10 is provided with spaced projections 11 rigidly secured to the sides thereof as shown at 11$^a$, and each is outwardly extended as shown at 12. The removable transplit member 10 which is of the contractible type is placed within the inner periphery of the tire 5 so as to provide means of supporting the beads of the tire on the periphery of the wheel and form a medium whereby the tire is separated from the periphery of the wheel. The extended portions 12 of the member 10 rest upon the transverse base Y of the periphery of the wheel.

A removable annular continuous tire flange comprises an outwardly flared flange 14 and an inwardly extended portion 21. The removable annular member is mated with the outer side of the wheel periphery by means of the contact of the extended portion 21 with the tapered portion 17, straight wall 20 and the tapered seat 24$^b$.

For the purpose of preventing creeping of the base member 10 in relation to the flanged members 14 and 15, each extended portion 12 thereof is secured in one of the apertures 13 in the flanged members 14 and 15 when the tire with the base member is mounted on the transverse body Y of the wheel periphery.

As shown, the tire with the contractible base 10 is mounted on the peripheral base Y, the tire being separated from the base Y by the contractible member 10, and having its valve stem 34 passed through the opening YB in the latter and both the tire and contractible member being secured by the flanged members 14 and 15 of the wheel, so that formation of rust or other adhering matter between the contractible member 10 and periphery Y is prevented, owing to the spaced projections 12 limitedly engaging with the periphery Y. As a result of the hereinbefore described arrangement of the members, separation of the contractible member from the periphery Y is easily accomplished and the tire is expeditiously removed from the contractible member.

In order to have the tire with the contractible member 10 securely locked on the wheel, bolts 19 are fixed in the side of the wheel and project outwardly, each passing through an opening in the inwardly extended portion 21 of the removable flanged member, and an opening in the clamp member 22. The latter have projecting portions 23 which engage in the space formed by the flange 14 and portion 21, and portions 24 which pass through the registered openings in the tapered portion 24$^b$ of the wheel, as shown at 25. By means of the position of each clamp member 22, the portion 23 firmly engages with the projection 12 of the contractible base member 10 and in the groove formed at the junction between the flange 14 and flange 21, while the opposite portion 25 of each clamp forms an engagement with the wheel.

The disk of the wheel, as shown at 27, is removably connected with the hub assembly 6, the central portion of the disk being engaged with the portions 28 of the hub and held in position by the removable member 29 which in turn is locked by the members 30 and 31, and by means of the cap 33 threaded to the hub which encloses the axle 32.

For the purpose of inflating the tire 5, the inner tube valve 34 is connected with the coupling member 35 by means of member $a$, and also with the disk, as shown at 7, so that there is extraneous access for connecting the usual air pump line thereto. In connection with the member 35, member 36 is secured thereto by means of member $b$, and the other end is connected to the pressure gauge 8.

As shown in Fig. 2, an operating lever 38 is arranged on the web of the tire base 10 and lies across the split between the ends $c$ and $d$. A mounting 39 is rigidly, remotely secured to the end $d$, as shown, by rivets 40, and the bifurcation 41 of the operating lever engages the free end of member 39 to form a pivoting engagement with the element 42. Lugs 44, one on each side of the lever, are secured to the end $c$ by rivets 45, the lugs each overlapping the split and pivoted to the side of the lever by a pin as shown at 43.

As shown, the tire base is circumferentially aligned between the flanges of the wheel to provide means of easy separation of the tire from the base member. The transverse body Y of the wheel is correctly centered in relation to the hub assembly, as particularly shown by the dotted line $x$. The tire is demountable at the wheel periphery, while the wheel is demountable at the hub.

In the accompanying drawings I have illustrated practical embodiments of the invention, but the construction therein shown is to be understood as illustrative only, and not as defining the limits of the invention.

Having thus described my invention, what I claim and desire to secure by Letters Patent is:

1. The combination with a vehicle wheel provided with an integral transverse member having an apertured tire flange and a removable apertured tire flange mounted thereon, and an intermediate tire base having spaced projections, each entering an aperture of the flanges, of a bearing on the outer side of the integral transverse member vertically extending to and terminating in a side bearing, a plurality of apertures in the last bearing, the removable tire flange engaging with the said bearings, a plurality of apertured clamps engaging the projections of the tire base and side of the removable flange on one hand, and the apertures in the side bearing on the other hand, and fixed bolts in the wheel passing through the removable flange and clamps, and nuts on the bolts drawing the parts together.

2. The combination with a vehicle wheel provided with a transverse body having an apertured integral tire flange and an apertured removable tire flange and a removable intermediate tire base having a series of spaced lateral projections, each engaging an aperture in the said flanges of a bearing surface on the transverse body vertically extending to and terminating in another bearing surface, a plurality of apertures in the last bearing surface, the removable tire flange paralleling with said vertical portion, and engaging with the said bearing surfaces of the transverse body of the wheel, apertured clamps engaging with the projections of said intermediate tire base and in channelled space of the removable tire flange, on one hand, and entering the openings in the last bearing surface, on the other hand, and fixed bolts in the wheel passing through the removable tire member and clamps to be engaged with nuts, the interengagement of the clamps with the apertures forming a co-operative locking of the parts.

3. The combination with a vehicle wheel comprising a transverse body having an integral apertured tire flange and a removable apertured tire flange, and a removable split tire base having spaced lateral projections engaging the apertures in the flanges, adapted for carrying a tire, of bearing surfaces in the outer side of the wheel, apertures in one of the bearing surfaces, apertured clamps engaging with the projections of the tire base and removable flange and each being inserted into one of the apertures, of the side bearing portion, bolts in the wheel passing through the flange and clamps, and nuts on the bolts.

4. The combination with a vehicle wheel including a transverse body having an integral apertured tire-flange and a removable apertured tire-flange having a channel, and a removable intermediate tire-base having lateral projections each engaging in one of the apertures of the flanges, adapted for carrying a tire, of a plurality of bearing surfaces on the outer side of the wheel, one of the bearing surfaces being apertured, means engaging in the channel of the removable tire-flange and with the lateral projections of the intermediate tire-base, on one hand, and entering into the apertures in one of the bearing surfaces, on the other hand, other means passing through the removable tire-flange and the said means and engaging with locking means adapted to draw the registered parts into a wedging engagement.

5. The combination with a vehicle wheel comprising a transverse body having an integral apertured tire flange and a removable apertured tire flange, and a removable intermediate tire base having lateral projections engaging the apertures in the flanges, of bearing surfaces with the transverse body vertically extended to and terminating in an inclined apertured seat, of a channel formed in the outer face of the removable tire-flange, a plurality of clamps each engaged with the vertical side of the body of the wheel, one portion of each of the clamps engaging in the channel of the removable tire-flange and with the lateral projections of the intermediate tire-base extending through the apertures in the removable tire-flange, the opposite portion of each clamp being engaged in one of the apertures in the inclined seat of the wheel, bolts in the side of the wheel each passing through one of the apertures in the removable tire-flange and one of the clamps and engaging with a nut, the provision of the channel in the removable tire-flange and of the apertures in the inclined seat of the wheel being for seating the clamps therein for sustaining thrust exerted thereagainst by the load of the vehicle equipped with the wheel and thereby holding the parts safely in an aligned position.

6. The combination of a wheel periphery comprising a transverse body including an outwardly flared flange and a bearing surface on the outer side thereof, a split annular member having side bearings, the member being adapted to be aligned in a tire, the tire with said member being adapted to be mounted on the transverse body of the wheel periphery in such manner as to provide a space between the member and body of the periphery thereby separating the tire from the periphery body, a removable annular flanged member mated with the outer side of the transverse body of the wheel periphery, the sides of the split annular member engaging the flange of the wheel periphery, bolts fixed in the side of the wheel periphery, clamping means engaging with the removable annular flanged member and means in the side of the wheel periphery, the bolts passing through openings in the removable flanged member and said clamping means and engaging with nuts for forcing the assembled parts into engagement of one with another.

7. A wheel periphery comprising a transverse body including an outwardly flared flange and a bearing on the outer side thereof, a contractible spacer member including side bearings therewith, the spacer being adapted to be aligned in a tire, the tire with the spacer being adapted to be mounted on the wheel periphery, the spacer being adapted to hold the tire separated from the transverse body of the wheel periphery, the side bearings of the spacer being adapted to engage with the wheel periphery and an annular removable member mated with the outer side of the wheel periphery and forming one of the means for securing the tire with the spacer on wheel periphery, clamping means engaging with the outer side of the annular removable member and the outer side of the wheel periphery, and means engaging with the wheel periphery adapted to lock the removable annular member into engagement with the tire and spacer.

8. A vehicle wheel comprising a periphery having a side flanged member and a plurality of bearing portions on the outer side thereof, a contractible spacer member being adapted to be aligned in a tire, the tire and spacer being adapted to be mounted on the wheel periphery engaging the flange of the side flanged member, an annular member mated with the outer side of the periphery and engaging with the bearing portions thereof, clamping members engaging with engaging means in the outer side of the annular member and means in the outer side of the wheel periphery, other members fixed in the side of the wheel periphery and passing through the annular member and the last members and engaging with nuts for drawing the assembled members together.

9. A vehicle wheel periphery having a side flanged member and bearing means on the outer side thereof, a contractible member being adapted to be aligned in a tire, the tire and contractible member being adapted to be mounted on the wheel periphery, the contractible member being adapted to separate the tire from the wheel periphery, side bearings with the contractible member adapted to form means whereby the contractible member is spacingly aligned on the periphery, a removable annular member having a flanged portion, the member being mated with the outer side of the wheel periphery and engaging with the outer side of the contractible member and the said bearing means of the wheel periphery, clamping members engaging with the removable annular member and clamping means in the wheel periphery, and means drawing the assembled parts together to safely secure the tire and contractible member on the wheel.

10. A vehicle wheel comprising a peripheral transverse body including an outwardly flared flange on the inboard side and a plurality of engaging means on the outboard side thereof, a contractible annular member positioned in a tire, the contractible member with the tire being mounted on the peripheral transverse body of the wheel, an annular flanged member having an engaging rib on the inner face, the annular flanged member being engaged with the outboard side of the wheel periphery in the manner such that the engaging rib thereof is engaged with the upper of the engaging means on the outboard side of the wheel periphery, bolts in the outer side of the wheel periphery, clamping members engaged with the outer face of the annular flanged member and the inner of the engaging means on the outboard side of the wheel periphery, the bolts being passed through the said clamping members and threaded with nuts exerting pressure against the clamping members to force the annular flanged member into wedging engagement with the wheel periphery for securing the contractible annular member with the tire on the transverse body of the wheel.

11. A vehicle wheel peripheral body comprising a transverse member including an outwardly flared flange on the inboard side and an inclined seat on the outboard side thereof, the outboard side of the peripheral body vertically extending to and terminating in engaging means, a contractible annular member in a tire, the tire with the contractible member being mounted on the transverse member of the wheel peripheral body, an annular flanged member having an engaging bead on the inner face, the said annular flanged member being engaged with the outboard side of the wheel periphery in the manner such that the engaging bead thereof is wedged with the inclined seat on the outboard side of the wheel periphery, bolts in the side of the outboard side of the wheel periphery, apertured clamping members engaged with the outer face of the annular flanged member and the engaging means of the wheel peripheral body, the bolts being passed through the apertured clamping members and engaged by nuts, thereby exerting force against the annular flanged member to move the bead thereof into wedging engagement with the outboard inclined seat of the wheel peripheral body for locking the mounted members with the wheel peripheral body.

In testimony whereof I have hereunto subscribed my name.

PHILIP M. MILLER.